Patented Aug. 31, 1954

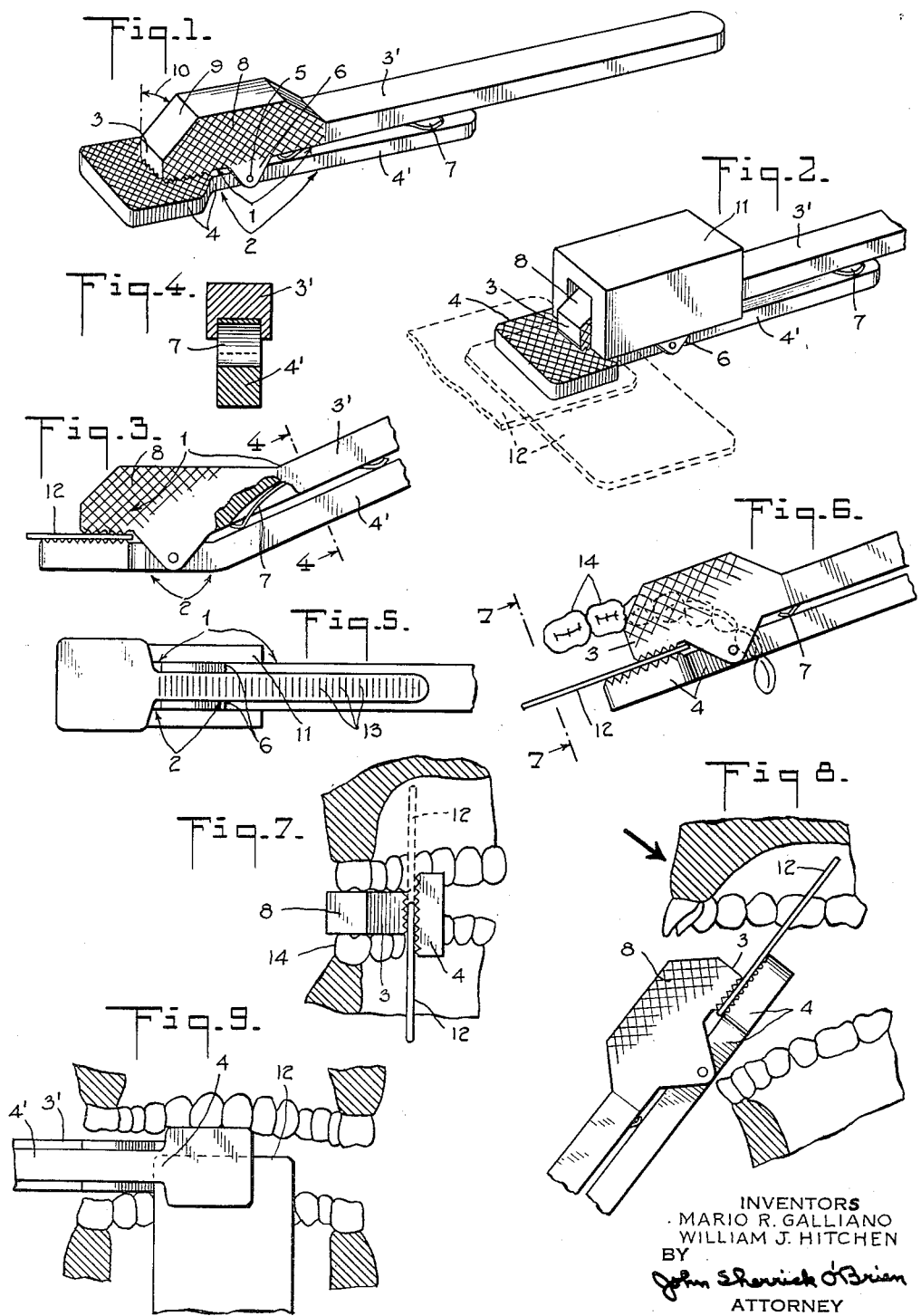

2,688,096

UNITED STATES PATENT OFFICE 2,688,096

DENTAL X-RAY FILM HOLDER

Mario R. Galliano and William J. Hitchen,
Los Angeles, Calif.

Application June 4, 1952, Serial No. 291,736

18 Claims. (Cl. 250—70)

This invention concerns a dental X-ray film holder. More particularly, it concerns improvements in dental X-ray film holder construction and a new and improved dental holder for positioning X-ray film in a mouth in accordance with the most advanced methods so that resulting roentgenograms are true and clear representations of mouth structures and conditions. The new holder concerned is used to position film correctly and securely for X-raying any of the tooth areas and yet is simple in design and operation, rapidly-positioned, and otherwise entirely practical.

Prior to our invention and over a period of many years, numerous devices for positioning dental X-ray films have appeared. Present day teaching advocates the use of several such devices to provide a complete set of X-rays for an entire mouth. In actual practice, however, numerous persons engaged in taking mouth X-rays still employ the unsatisfactory method of emplacing film in a patient's mouth by hand or by instrument followed by placing the patient's finger on the film, to secure it while adjusting and operating the X-ray machine. That such a practice persists is attributable to lack of satisfactory equipment and, particularly, to lack of equipment which can be employed speedily and effectively. The use of complicated devices or of a multiplicity of devices renders the taking of roentgenograms, or radiographs, excessively time-consuming. Furthermore, devices available are lacking in desired features.

It is therefore an object of this invention to provide improvements in dental X-ray film holder construction and a dental X-ray film holder which overcome the deficiencies of the prior devices. Another object is to provide a single holder which can be used rapidly for a full mouth X-ray examination and which will position X-ray film as desired to enable the obtainment of a true and clear roentgenogram of any of the tooth areas of the human mouth, with no need for other equipment of like purpose.

A particular object is to provide such a holder which will hold X-ray film securely in place in any desired area of the mouth without the film bending unnecessarily or being otherwise distorted, but remaining as near possible in one plane.

A further object is to provide an X-ray film holder which is economical, simple in operation and construction, and for the most part can be fabricated of non-metals, to conserve critical materials. At the same time, it is an object of our invention to provide a holder which is easily and completely sterilizable.

An important object of this invention is to provide a holder which may be positioned with film in a patient's mouth without inserting the human fingers, and with minimal discomfort to the patient. It is another object that after insertion, the holder be maintainable in fixed position by the patient without strain on him and accompanying discomfort and movement.

Additional objects include: providing an X-ray film holder which will position films in parallel spaced relation to the teeth and otherwise positioned in accordance with the most advanced teachings, to avoid diffusion, distortion, overlapping, elongation, foreshortening, shadowing, and so forth; providing a holder which may be employed as well with edentulous patients; providing a holder which is flexible in operation and thus adaptable to the various mouth formations encountered; providing a holder which remains clear of the path of X-rays to a film, allowing X-ray projection at desired angles without interference and providing maximal unobstructed film surface; and providing a holder which will accommodate films of different dimensions, adjustably positioned with respect to the holder as desired. It is to be understood that whenever X-ray film is referred to herein, we mean to include film as ordinarily supplied and used in X-raying, that is, enclosed in protective packets or the like.

We have now invented improvements in dental X-ray film holder construction and a new and improved dental X-ray film holder which accomplish the above and other objects, as will be apparent from a consideration of the following description and accompanying drawings of preferred embodiments of our invention in which the various parts are identified by suitable reference characters in each of the views, and in which:

Figure 1 is a perspective view of a preferred form of our new holder;

Figure 2 is a perspective view of another preferred form of the holder and showing it as used with edentulous patients, and illustrating two alternative X-ray film positions therein;

Figure 3 is a side elevational view of another form of the holder, with X-ray film inserted and with part of the construction broken away and in section, to exhibit a preferred resilient means;

Figure 4 is an enlarged, transverse view in the direction of the arrows 4—4 in Figure 3;

Figure 5 is a bottom plan view of the holder shown in Figure 2;

Figure 6 is a side view of a form of holder similar to that shown in Figure 1 with X-ray film inserted, in radiographing position with respect to lower molar teeth, shown in plan view, and with part of the holder resting on the teeth;

Figure 7 is a transverse view in the direction of the arrows 7—7 in Figure 6, and showing also the upper jaw and an alternative film position;

Figure 8 is a transverse view of human jaws, from one side of a mouth, and showing a holder and film positioned for radiographing the upper anterior region; and Figure 9 is a transverse view of human jaws, from the back of a mouth, and showing a holder and film positioned for radiographing the lower anterior region.

Referring to Figure 1 of the drawings, illustrating a preferred embodiment of our invention, jaw and handle members 1 and 2, having jaws 3 and 4 and handles 3' and 4' respectively, are pivotally connected intermediately of their ends, at the junctions of their respective jaws and handles, as by pin 5 extending through jaw and handle member 2 and projections 6, which extend from jaw and handle member 1 and which overlie jaw and handle member 2. Other means for pivotally connecting the jaw and handle members may be employed as well.

Jaw and handle members 1 and 2 are disposed opposite to each other and sufficiently spaced where pivotally connected to permit insertion of X-ray film packets of various thicknesses between jaws 3 and 4. The planes of the inner, opposing (gripping) faces of jaws 3 and 4 are preferably about parallel when gripping a film. Jaw 4, or effective portions thereof, extends laterally of the sides of its handle 4', and of the sides of jaw 3, at least its inner or gripping face being substantially planar. Fabrication is simple when the inner and outer faces of jaw 4 are in the same planes with the corresponding inner and outer faces of its handle 4', as shown. The inner face of jaw 4 is of area sufficiently large to provide backing for a substantial portion of an X-ray film however inserted between jaws 3 and 4, in taking X-rays of any of the several areas of the mouth. In this connection, effective sections of the inner face of jaw 4 preferably extend laterally in each direction from its longitudinal axis for a distance of about one-quarter or more of the width and longitudinally for a distance or about one-third or more of the length of a dental X-ray film, while extending longitudinally beyond the free end of jaw 3 for a distance of about one-quarter or more of the length of such a film.

At the same time, lateral extensions preferably provide a width of jaw 4 no greater than about that of a dental X-ray film, to preclude interference with the upper jaw of the mouth when X-raying the upper anterior region, as in Fig. 8; and longitudinal extensions preferably provide a length of jaw 4 where extended laterally no greater than about the width of such a film, to preclude interference with the lower jaw of the mouth when X-raying the lower anterior region, as in Fig. 9. An X-ray film is thus firmly supported in a single plane, especially important when X-raying the upper anterior region, as in Fig. 8.

Jaw 3 and the inner or gripping face thereof are preferably minimal in width and longitudinally overlying jaw 4, and preferably the enlarged portion thereof, for a distance sufficient to provide a secure grip on an inserted film. Thus, an inserted film may be merely nipped by jaw 3 at one edge, as in Fig. 8, to leave a maximum of film surface unobstructed by jaw 3. At the same time, the length of jaw 3 (its length and that of jaw 4 being governed by the location of pivotal connection in the embodiment shown) is advantageously sufficient to permit the insertion of an X-ray film as far as about one-half to three-quarters of its width, for maximum film rigidity when X-raying in positions such as those shown in Figs. 6 and 9, yet avoiding interference of jaw 4 with the lower jaw of the mouth in the position of Fig. 9. For this purpose, particularly, the inner face of each of jaws 3 and 4 is preferably substantially planar throughout its length. Jaw 4, extending laterally and longitudinally at its free end beyond the free end of jaw 3, outwardly of the periphery of the gripping face of jaw 3 at the free end thereof, as described, serves to support the film substantially in a single plane, in all events.

The size of X-ray film packet contemplated in the foregoing recitation of preferred dimensions is that in most common use and of adult size, i. e., about one and one-quarter inches in width by about one and five-eighths inches in length. The most versatile holder dimensions are those closer to the minimal one set forth.

Optionally, the inner faces of jaws 3 and 4 are provided with serrations or the like, as shown in Figs. 1, 2, 3, 6, 7, and 8, to aid in gripping firmly an inserted film. It will be apparent that considerable variation in design and construction of jaws 3 and 4 may be made while still accomplishing the herein-described purpose and falling within the scope of our invention.

Handles 3' and 4' extend longitudinally from their respective jaws far enough for utility in opening and closing the jaws. We greatly prefer to employ resilient means, such as spring 7, to urge jaws 3 and 4 together, for most efficient operation. The handles are then sufficiently long to provide adequate leverage and to accommodate the resilient means. At least one of the handles, preferably handle 3', as shown, is long enough to enable insertion of the holder in the mouth to the greatest distance desired with no necessity for insertion of fingers and to enable the patient to grasp the handle well when necessary.

Spring 7, which is preferably removable, rests on and bears against the inner face of handle 4'. The spring bears on and is partly enclosed within handle 3', a portion of which is cut out to provide retaining means, illustrated in one embodiment of the invention in Figures 3 and 4.

Still referring generally to Figure 1, there is provided on jaw and handle member 1 and integral therewith a rigid, laterally extending bite member or projection 8, for gripping by a patient's teeth. The bite member, preferably extending in fixed position, may be attached to the jaw and handle member or may form one piece with it as shown. Two faces or surfaces of the bite member lie, preferably, in planes substantially perpendicular to the planes of the gripping faces of the jaws and to the plane of a film inserted therebetween. Also, two sides of jaw and handle member 1 are, preferably, continuations of these faces of the bite member, as shown. Thus, there is provided bite surfaces including faces of the bite member and sides of jaw and handle member 1 for easy gripping by a patient's teeth in the various positions in which a holder may be placed. Optionally, the bite surfaces are provided with serrations or the like, for close engagement with the teeth. Handle 4' preferably extends laterally no further than the sides of jaw and handle member 1 and the bite faces of the bite member, so as not to interfere with the teeth when gripping the holder.

The bite member preferably extends from about the free end of jaw 3 to a point on handle 3' intermediate its ends, and for a distance sufficient to provide good gripping in all positions by normal teeth. It projects from jaw and handle member 1 for a distance sufficient to provide good gripping in all positions by the teeth, particularly when the holder is emplaced with the film spaced inwardly from the teeth as far as desired to take X-rays in accordance with most advanced teachings. The length and width of the bite member are also no greater than required, so that interference with a patient's cheeks is minimized. The bite member side 9 near the free end of jaw 3 is preferably inclined so that angle 10 is about 45 degrees, to permit X-ray projection at acute angles to the film without obstruction. The bite member may also be spaced rearwardly from the free end of jaw 3 if desired.

In the embodiment of our invention shown in Figure 2, there is removably emplaced over bite member 8 a U-shaped adapter 11 which serves to extend the bite surfaces for edentulous patients. Various modifications in the adapter can be made and still achieve the same purpose, and a number of such adapters of varying proportions can be employed for use with the different teeth formations encountered. There is also shown in Figure 2 two alternative positions of an X-ray film packet 12.

In another embodiment of our invention shown in Figure 3, handles 3' and 4' are for the most part inclined upwardly from the planes of the gripping faces of the jaws, to reduce interference with teeth or cheek in certain of the positions of the holder in the mouth. Each of jaw and handle members 1 and 2 is therein formed substantially about two longitudinal axes, each pair of axes lying substantially in a single plane and intersecting at a point in its corresponding handle near the axis of pivotal movement. Other bending of either or both of jaw and handle members 1 and 2 about the axis of pivotal movement is also possible. However, for greatest versatility, we prefer to construct the jaw and handle members so that they each are formed substantially about a single longitudinal axis, the two axes being substantially parallel, as shown in Figure 1, for example. A portion of handle 3' is also cut away in Figure 3, to reveal the spring 7 positioned in part within the handle. Figure 4 presents another view of the spring in position.

Figure 5, a bottom plan view of the holder shown in Figure 2, particularly shows grooves or indentations 13 which may be provided on the bottom side of jaw and handle member 2, and which are designed to be engaged by the teeth to preclude holder movement, when taking X-rays as in Figure 8.

Figure 6 shows a holder with film 12 inserted, positioned for taking X-rays of the lower molar area and illustrating the positioning of the film in spaced relation to and parallel to the long axes of the teeth 14, in accordance with advanced teachings. Figure 7 presents another view of the holder and film in position as shown in Figure 6 and also including the upper jaw and an alternative film position for X-raying the upper molars.

Figures 8 and 9 illustrate holder positions for X-raying the anterior regions. The film is positioned in Figure 8 inclined from the vertical and spaced rearwardly from the teeth, in accordance with advanced teachings, the X-rays passing in the general direction indicated by the arrow.

Our new holder may be constructed of various rigid, non-porous materials such as metal, plastic, or the like. For a patient's comfort, bite surfaces are preferably of softer material, such as a plastic. We ordinarily construct the holder entirely of plastic material, a variety of resinous products being suitable, except that the resilient means is desirably a spring of metal suitable for cold sterilization, such as stainless steel. When pivot pin 5 is used, it also is preferably made of metal such as stainless steel. The holder is thus eminently suited for complete sterilization.

In operation, a film is inserted in a desired manner between the jaws of the holder, opened by pressing the handles together. On releasing the handles, the jaws grip the film securely. The holder with film inserted is then placed in the mouth, using one or both handle ends for this purpose and positioning the film as desired; and the patient closes his teeth on the bite member to fix the position of the film, except when X-raying the upper anterior region. When the upper anterior region is X-rayed, the bottom of the holder is rested on the lower anterior teeth, and the patient grasps one or both handles, holding motionless his mouth and the holder. While with the preferred form of holder as shown in Figure 1 the plane of the film is known from the position of the handles extending from the patient's mouth, variations may make it desirable to mark one or both handles to indicate the direction for X-ray projection. The X-rays are then taken. The operator is thus able to proceed rapidly, X-raying the entire mouth in a very short period of time, accurately, and with a minimum of discomfort to the patient.

Modifications in the construction of the preferred embodiments of our invention set forth herein which are within the scope of our invention will occur to those skilled in the art, and to the extent that such modifications are within the scope of the appended claims, it is to be understood that they constitute part of our invention.

We claim:

1. A dental X-ray film holder comprising two pivotally connected jaw and handle members, the jaws of said members being adapted to grip between them an X-ray film and the free end of the jaw of one of said members extending laterally and longitudinally beyond the free end of the jaw of the other of said members and being adapted to provide rigid substantially planar backing for a substantial portion of an X-ray film when gripped between the said jaws; a bite member extending laterally from the second-named of said jaw and handle members and including bite surfaces lying in planes substantially perpendicular to the plane of a film when gripped between the said jaws; and means urging said jaws together.

2. A dental X-ray film holder as defined in claim 1 including resilient means urging said jaws together.

3. A dental X-ray film holder as defined in claim 1 wherein the second-named of said jaw and handle members includes sides which form continuations of said bite surfaces, and the handle of the first-named of said jaw and handle members is adapted to permit biting engagement of the human mouth with the said sides and the said bite surfaces.

4. A dental X-ray film holder as defined in claim 1 wherein each of said jaw and handle members is formed substantially about a single longitudinal axis.

5. A dental X-ray film holder as defined in claim 1 wherein each of said jaw and handle members is formed substantially about two longitudinal axes, each pair of axes lying substantially in a single plane and intersecting intermediately of the ends of the corresponding jaw and handle member.

6. A dental X-ray film holder as defined in claim 1 including an adapter in removable engagement with said bite member.

7. A dental X-ray film holder comprising two rigid jaw and handle members pivotally connected at the junctions of their respective jaws and handles, the jaws of said members being adapted to adjustably grip between them an X-ray film and the free end of the jaw of one of said members extending laterally and longitudinally beyond the free end of the jaw of the other of said members and being adapted to provide rigid substantially planar support for a substantial portion of an X-ray film when gripped between the said jaws and however positioned therebetween; a rigid bite member extending laterally in fixed position from the second-named of said jaw and handle members and including bite surfaces lying in planes substantially perpendicular to the plane of a film when gripped between the said jaws; and resilient means urging said jaws together.

8. A dental X-ray film holder as defined in claim 7 wherein said resilient means are included in the handles of said jaw and handle members.

9. A dental X-ray film holder as defined in claim 7 wherein the second-named of said jaw and handle members includes sides which form continuations of said bite surfaces, and the handle of the first-named of said jaw and handle members is adapted to permit biting engagement of the human mouth with the said sides and the said bite surfaces.

10. A dental X-ray film holder as defined in claim 7 including an adapter in removable engagement with said bite member.

11. A dental X-ray film holder comprising two rigid, elongated members pivotally connected, intermediately of their ends and disposed in spaced relation to each other, one of said members including two substantially flat sides whose planes are substantially parallel and which extend throughout an appreciable portion of the length of the member, and having a projection disposed toward one of its ends, said projection including surfaces forming continuations of said sides, the second of said members having an enlarged portion at one end thereof opposed to the end of the first-named member nearer said projection said portion including a substantially flat face extending laterally and longitudinally beyond the opposing end of said first-named member, said face being substantially perpendicular to the planes of said sides, the remainder of said second member being adapted to permit biting engagement of the human mouth with said sides and said surfaces, and said flat face and said opposing end, at a surface opposed to the surface having said projection, being adapted to adjustably grip between them an X-ray film; and resilient means urging said members together where adapted to grip a film between them.

12. A dental X-ray film holder as defined in claim 11 including an adapter in removable engagement with said projection.

13. A dental X-ray film holder comprising two pivotally connected jaw and handle members, the jaws of said members being adapted to grip between them an X-ray film and the free end of the jaw of one of said members extending laterally in each direction and longitudinally beyond the free end of the jaw of the other of said members and being adapted to provide rigid substantially planar backing for a substantial portion of an X-ray film when gripped between the said jaws; a bite member integral with and extending laterally from the second-named of said jaw and handle members and including bite surfaces lying in planes substantially perpendicular to the plane of a film when gripped between the said jaws; and means for urging said jaws together.

14. A dental X-ray film holder as defined in claim 13 including resilient means urging said jaws together.

15. A dental X-ray film holder as defined in claim 13 wherein the second-named of said jaw and handle members includes sides which form continuations of said bite surfaces, and the handle of the first-named of said jaw and handle members is adapted to permit biting engagement of the human mouth with the said sides and the said bite surfaces.

16. A dental X-ray film holder comprising two pivotally connected jaw and handle members, the jaws of said members being adapted to grip between them an X-ray film and the free end of the jaw of one of said members extending laterally in each direction and longitudinally beyond the free end of the jaw of the other of said members and being adapted to provide rigid substantially planar backing for a substantial portion of an X-ray film when gripped between the said jaws, effective sections of the inner face of the jaw of the first-named of said members extending laterally in each direction from its longitudinal axis for a distance of at least about one-quarter of the width of an X-ray film and extending longitudinally for a distance of at least about one-third of the length of an X-ray film; a bite member extending laterally from the second-named of said jaw and handle members and including bite surfaces lying in planes substantially perpendicular to the plane of a film when gripped between the said jaws; and means for urging said jaws together.

17. A dental X-ray film holder comprising two pivotally connected jaw and handle members, the jaws of said members being adapted to grip between them an X-ray film and the free end of the jaw of one of said members extending laterally in each direction and longitudinally beyond the free end of the jaw of the other of said members and being adapted to provide rigid substantially planar backing for a substantial portion of an X-ray film when gripped between the said jaws, effective sections of the inner face of the jaw of the first-named of said members extending laterally in each direction from its longitudinal axis for a distance of at least about one-quarter of the width of an X-ray film and extending longitudinally for a distance of at least about one-third of the length of an X-ray film while extending longitudinally beyond the free end of the jaw of the second-named of said members for a distance of at least about one-quarter of the length of an X-ray film, the length where extended laterally and the width of the jaw of the first-named of said members each being no greater than about the width of an X-ray film; a bite member extending laterally from the second-named of said jaw and handle members and including bite surfaces lying in planes substantially perpendicular to the plane of a film when gripped between the said jaws; and means for urging said jaws together.

18. A dental X-ray film holder as defined in claim 17 wherein the jaw of the second-named of said jaw and handle members extends longitudinally over the laterally extended portion of the jaw of the first-named of said members and is sufficiently long to permit the insertion of an X-ray film as far as about one-half of the width of the film.

References Cited in the file of this patent

UNITED STATES PATENTS

| Number | Name | Date |
| --- | --- | --- |
| 1,321,465 | MacLagan | Nov. 11, 1919 |
| 1,465,516 | Hallenberg | Aug. 21, 1923 |
| 1,698,795 | Hillman | Jan. 15, 1929 |
| 2,035,051 | Daly | Mar. 24, 1936 |